United States Patent Office.

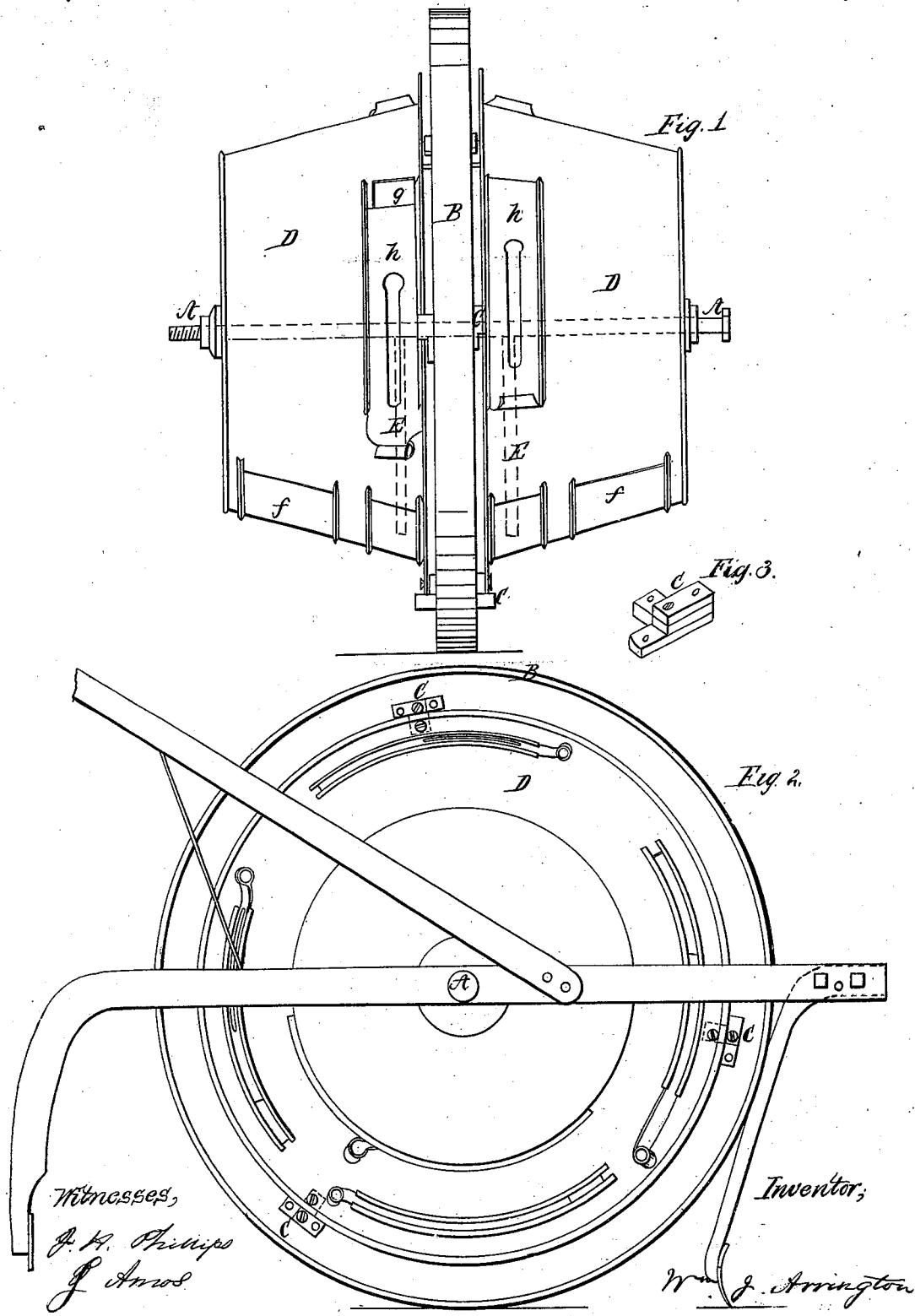

WILLIAM J. ARRINGTON, OF JEFFERSON COUNTY, GEORGIA.

Letters Patent No. 92,144, dated July 6, 1869.

IMPROVEMENT IN COTTON-SEED PLANTER AND DRILL.

The Schedule referred to in these Letters Patent and making part of the same.

*To all whom it may concern:*

Be it known that I, WILLIAM J. ARRINGTON, of Jefferson county, Georgia, have invented a new and useful Improvement in Cotton-Seed Drills or Seed-Planters, of which the following is a full, clear, and exact description, reference being had to the accompanying drawing, forming a part of this specification, in which—

Figure 1 represents a front elevation of the drill.
Figure 2, side elevation, with frame-work.
Figure 3, triangular button or nut.
Like letters of reference indicate corresponding parts.

The revolving portion and axis of the cotton-seed drill or seed-planter, (the common frame by which it operates being only described in accompanying drawing,) consists—

First, in a fixed axis, A;
Secondly, in a central iron-bound wooden wheel, B;
Thirdly, adjustable triangular buttons, C, and screws; and
Fourthly, two contrivances, D, commonly called drums, for reception of the things to be distributed or planted.

The axis is straight, and passes through the centre of the drums and central wheel; has screws on one or both ends, for securing it to the frame-work and adjusting the drums; and has near its centre, and in either drum, a spike, E, permanently fixed, which points perpendicularly downward, coming, by its point, to near the portals and places, hereafter described, for escape of seed or contents, the object of which spike is to keep the seed and things sown stirred up, and to facilitate their escape.

The central wheel is of wood, and rimmed with iron; is about one inch in thickness, and from twenty-five to thirty-five inches in diameter, according to the size of the machine desired; is from four to six inches larger in its diameter than the largest diameter of drums; it is penetrated centrally by the fixed axis, and having the drums attached on either side, revolves them by its rolling on the ground around the axis.

The drums may be made of thick tin or sheet-iron. They are bevelled or sloped toward their outer ends, and resemble two large tin pans, fixed, at their open or larger diameters, on either side of the wheel. They are flanged at their larger rims, to allow of attachment to the sides of the wheel, by the screws and adjustable triangular buttons.

They have sliding or hinged doors, shutters, *f*, through the openings of which the things to be sown are put in, and have, at convenient distances from each other, and around the larger or wheel-border, a series of little portals or holes, *g*, that may be closed or opened by sliding doors *h*, and through which the seed or contents drop out in their revolution. These portals may be opened or closed in any numbers, according as the seed or contents are to be dropped, at near or short intervals.

By means of the adjustable triangular buttons, which have, each, triangular projections of different degrees of thickness, and their screws, the drums are not only made fast to the wheel, but may be made either flush to its sides, or removed any desired distance therefrom, thus allowing of a space between the drums and sides of the wheel, through which space the contents or seed may escape in any desired quantity, when the sowing or drilling is preferred to the dropping of the same, which latter operation is done by opening the portals, and turning the buttons from under the rims, and then securing them flush or smoothly to the sides of the wheel by the screws.

It will be seen by this description, that the machine may be made (by putting the seed on one side and guano on the other) to, first, either sow one or the other at a time, or both at a time, or to drop or check them separately or both together, and in such distances of each other as may be desired.

Such being the description of my machine, and for which I ask Letters Patent of the United States.

Claims.

1. The adjustable portals *g*, and doors *a*, in a revolving cotton-seed drill or seed-planter, substantially as herein shown and described.

2. The triangular buttons C, constructed in the manner and for the purpose above set forth.

3. The drums D D, with the separating-wheel B, made and applied substantially as herein shown and specified.

WM. J. ARRINGTON.

Witnesses:
JAMES L. NORRIS,
F. S. SAMSON.